United States Patent
Bruchmann et al.

(10) Patent No.: US 6,538,096 B2
(45) Date of Patent: Mar. 25, 2003

(54) STORAGE-STABLE POLYISOCYANATES

(75) Inventors: Bernd Bruchmann, Freinsheim (DE); Günter Mohrhardt, Speyer (DE); Hans Renz, Meckenheim (DE); Joachim Jähme, Bobenheim-Roxheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 39 days.

(21) Appl. No.: 09/771,976

(22) Filed: Jan. 30, 2001

(65) Prior Publication Data

US 2001/0016623 A1 Aug. 23, 2001

(30) Foreign Application Priority Data

Feb. 5, 2000 (DE) .......................... 100 05 228
Nov. 21, 2000 (DE) .......................... 100 57 603

(51) Int. Cl.$^7$ ............................... C08G 18/73
(52) U.S. Cl. ............... 528/73; 528/59; 252/182.21; 252/182.22; 427/385.5; 428/423.1
(58) Field of Search ............. 252/182.21, 182.22; 528/73, 59; 427/385.5; 428/423.1

(56) References Cited

U.S. PATENT DOCUMENTS

| 4,015,155 | A |   | 3/1977 | Lang |
| 4,454,317 | A |   | 6/1984 | Disteldorf et al. |
| 4,910,332 | A | * | 3/1990 | Kahl et al. |
| 5,208,334 | A | * | 5/1993 | Potter et al. |
| 5,789,519 | A |   | 8/1998 | Slack et al. |
| 5,859,163 | A | * | 1/1999 | Slack et al. |
| 6,437,074 | B1 | * | 8/2002 | Gras et al. |

FOREIGN PATENT DOCUMENTS

| CA | 2211025 | 8/1996 |
| DE | 42 29 183 | 3/1994 |
| EP | 0 017 998 | 10/1980 |
| EP | 0 303 150 | 2/1989 |
| EP | 0 524 501 | 1/1993 |
| EP | 0 566 037 | 10/1993 |
| EP | 0 809 663 | 12/1997 |
| WO | WO 96/25444 | 8/1996 |

OTHER PUBLICATIONS

H. Dahm, et al., Kunstoff Handbuch, vol. 7, No. 2, pps. 599–642, "Pur–Anstrichstoffe Und Beschichtungen," 1993.

M. Bock, Polyurethane für Lacke und Beschichtungen, pps. 52–54, "Chemische Und Technologische Grundlagen," 1999.

H.J. Laas, et al., Journal für praktiscke Chemie, vol. 336, pps. 185–200, "Zur Synthese Aliphatischer Polyisocyanate–Lackpolyisocyanate Mit Biuret–, Isocyanurat–Oder Uretdionstrucktur," 1994.

* cited by examiner

*Primary Examiner*—Rachel Gorr
(74) *Attorney, Agent, or Firm*—Oblon, Spivak, McClelland, Maier & Neustadt, P.C.

(57) ABSTRACT

Mixtures comprise
a) polyisocyanates (polyisocyanates A), comprising structural units selected from the isocyanurate and biuret group, derived from aliphatic or cycloaliphatic diisocyanates (diisocyanates C),
b) non-A polyisocyanates (polyisocyanates B), comprising structural units selected from the allophanate and urethane group, derived from
  b1) aliphatic or cycloaliphatic diisocyanates (diisocyanates C) and
  b2) polyhydric aliphatic or cycloaliphatic alcohols (alcohols A), the molar ratio of the polyisocyanates A to the polyisocyanates B being from 200:1 to 5:1.

13 Claims, No Drawings

STORAGE-STABLE POLYISOCYANATES

The present invention relates to mixtures comprising a) polyisocyanates (polyisocyanates A), comprising structural units selected from the isocyanurate and biuret group, derived from aliphatic or cycloaliphatic diisocyanates (diisocyanates C), b) non-A polyisocyanates (polyisocyanates B), comprising structural units selected from the allophanate and urethane group, derived from
   b1) aliphatic or cycloaliphatic diisocyanates (polyisocyanates C) and
   b2) polyhydric aliphatic or cycloaliphatic alcohols (alcohols A), the molar ratio of the polyisocyanates A to the polyisocyanates B being from 200:1 to 5:1.

Crosslinking polyisocyanates and binder components containing isocyanate-reactive groups are known in general in the form, for example, of 2-component (2K) coating materials (cf. Kunststoff Handbuch, Volume 7, Polyurethanes, 2nd edition, 1993, Carl Hanser Verlag Munich, Vienna, pp. 599 to 642; M. Bock, Polyurethane fur Lacke und Beschichtungen, Vincentz-Verlag, Hanover, 1999, and Journal fur praktische Chemie, 336 (1994) 185–200). These 2-component coating compositions comprise as their binder, for example, a polymeric polyol and as their crosslinker component (curing agent) a compound containing two or more free isocyanate groups.

The service properties of coatings whose polymeric binders have been crosslinked with the isocyanates are greatly improved over those of systems comprising binders of low molecular mass. This relates in particular to service properties such as insensitivity to mechanical stress such as tension, elongation, impact or abrasion, resistance to moisture (in the form of water vapor, for example) and dilute chemicals, resistance to environmental effects such as temperature fluctuations and UV radiation, high gloss of the coated surfaces, and high transparency.

It is expected that the curing agents not only give the fully cured coatings the aforementioned service properties but also improve, or at least detract very little from, the processing properties of the coating materials prior to their application.

In order that the coating materials can be applied without problems to the target surface by conventional techniques, e.g., by spraying, the coating materials ought to have a limited viscosity. Coating materials based on 2-component coating compositions therefore normally include solvents. The high solvent content of these coating materials, however, causes problems, since the processors of the coating materials have to take technically complex measures in order to prevent the solvents released on application and drying of the coating materials from entering the atmosphere. Consequently, the search has been on for curing agents which cause very little increase, or, even better, which lower, the viscosity of the binder-containing component. of course, these curing agents must themselves not exhibit any notable volatility even at room temperature, as is the case with commercially customary monomeric isocyanates such as hexamethylene diisocyanate or isophorone diisocyanate. Moreover, even on prolonged storage, the curing agents must not increase their viscosities, since for the user this would necessitate a further addition of solvent during the preparation of the coating formulation.

Additionally, the 2-component coating compositions should cure fully as soon as possible after application, so that the coated articles following application may rapidly be processed further or utilized.

Products which possess this profile of properties, at least to a satisfactory extent, include polyisocyanates which carry allophanate units, for example, and which are known from EP-A- 303150. Polyisocyanates containing isocyanurate units are known, for example, from EP-A-0017998 and US 4015155.

However, these polyisocyanates are still in need of improvement as far as the stability on storage is concerned, especially under hot conditions. On prolonged storage, the products become more viscous, turn cloudy, form flocs, or gel.

It is an object of the present invention to provide a polyisocyanate having the aforementioned profile of properties which can be stored for prolonged periods without undergoing substantial changes in its properties.

We have found that this object is achieved by the mixtures defined at the outset and processes for preparing them, by 2-component coating compositions which comprise these mixtures, and by articles coated with said 2-component coating compositions.

The polyisocyanates A are known per se. They comprise preferably 1, 2 or 3 structural units selected from the isocyanurate and biuret group. Polyisocyanates C from which the polyisocyanates A are derived include in particular those of the formula (I) OCN-$R^1$-NCO, where $R^1$ is an alkylene or cycloalkylene unit having 4 to 20 carbon atoms, preferably derived from hexamethylene diisocyanate (HDI) or isophorone diisocyanate (IPDI) by abstraction of the NCO groups.

Particular preference is given to the following polyisocyanates A:

I. polyisocyantes of aliphatic or cycloaliphatic diisocyanates, containing isocyanurate groups. Particular preference is given in this context to the corresponding isocyanato-isocyanurates based on hexamethylene diisocyanate (HDI) or isophorone diisocyanate (IPDI). The isocyanurates in question comprise, in particular, simple trisisocyanatoalkyl or trisisocyanatocycloalkyl isocyanurates, which constitute cyclic trimers of the diisocyanates, or comprise mixtures with their higher homologs containing more than one isocyanurate ring (e.g., 2 or 3 such rings). The isocyanato-isocyanurates generally have an NCO content of from 10 to 30% by weight, in particular from 15 to 25% by weight, and an average NCO functionality of from 2.6 to 4.5.

Particularly appropriate compounds are isocyanurates of the formula (IVa)

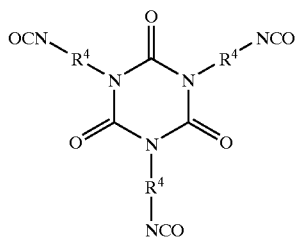

or the oligomeric forms deriving therefrom, in which $R^4$ has the same definition as $R^1$ in polyisocyanate A.

II. Polyisocyanates containing biuret groups and containing isocyanate groups attached to aliphatic or cycloaliphatic moieties, the preparation of such polyisocyanates being described, for example, in H. J. Laas et al., J. prakt. Chem. 336 (1994) 185–200, or EP-A-809663 (polyisocyanates AII). These polyisocyanates include in particular those derived from IPDI and also bis(4-isocyanatocyclohexyl)methane (HMDI). Particular preference is given to tris(6-isocyanatohexyl)biuret or its mixtures with its higher homologs. These polyisocyanates containing biuret groups generally have an NCO content of from 10 to 30% by weight, in particular from 18 to 25% by weight, and an average NCO functionality of from 2.8 to 4.5.

The biuretizing agents from which the polyisocyanates A containing biuret groups are derived comprise water, amine, and a substance which generates water. Suitable water-generating substances are, for example, monohydric tertiary alcohols such as tert-butanol or isobutanol, or ion exchangers.

The polyisocyanates B, too, are compounds already known per se.

They are preferably derived from the same polyisocyanates C which were described above, with particular preference from HMDI, HDI, and IPDI.

Regarding the alcohols A, it is possible to use any aliphatic or cycloaliphatic polyhydric alcohol. The alcohols in question are preferably those of the formula (II) HO—$R^2$—OH, where $R^2$ is an alkylene or cycloalkylene unit having 2 to 20 carbon atoms, which is uninterrupted or interrupted by oxygen atoms and in which, if desired, 1 to 4 hydrogen atoms are substituted by $C_1$ to $C_{12}$ alkyl radicals. Branched diols are particularly preferred, such as propylene glycol, 1,2- and 1,3-butanediol, 2,2,4,4-tetramethyl-1,3-cyclobutanediol, 2-methyl-1,4-butanediol, 3-methyl-1,3-butanediol, 1,2- and 1,3-pentanediol, 2-methyl-2,4-pentanediol, 3-methyl-1,5-pentanediol, 2,4-dimethyl-2,4-pentanediol, 2,4-dimethyl-1,5-pentanediol, 2,2,4-trimethyl-1,3-pentanediol, 1,2-, 1,3- and 1,4-hexanediol, 2-ethyl-1,3-hexanediol, 2,5-dimethyl-2,5-hexanediol, dipropylene glycol, tripropylene glycol, neopentyl glycol, and neopentyl glycol hydroxypivalate; particular preference is given to the use of neopentyl glycol, neopentyl glycol hydroxypivalate, 2,2,4-trimethyl-1,3-pentanediol, 2-ethyl-1,3-hexanediol, 2,4-diethyl-1,5-octanediol, or mixtures thereof.

Preferred polyisocyanates B are those of the formula (III)

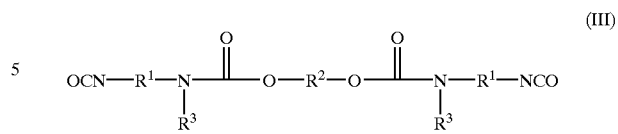

where
$R^1$ is as defined for the formula I,
$R^2$ is as defined for the formula II, and
$R^3$ is hydrogen or a radical —CO—NH—$R^1$—NCO, where $R^1$ has the same definition as in the formula I, with the proviso that at least one radical $R^3$ is not hydrogen.

The molar ratio of the polyisocyanates A to the polyisocyanates B is preferably from 100:1 to 20:1.

The mixtures of the invention may also include small fractions—generally amounts of from 0.5 to 10% by weight, based on the polyisocyanates A—of polyisocyanates containing urethane and allophanate groups and derived from monohydric primary or secondary $C_1$ to $C_{20}$ alkyl alcohols. Examples of suitable monohydric alcohols are aliphatic or cycloaliphatic alcohols such as methanol, ethanol, propanol, isopropanol, n-butanol or 2-ethylhexanol.

The mixtures of the invention may be prepared by various processes:

The procedure according to variant A is to prepare the polyisocyanate B by (A1) reacting diisocyanates C and alcohols A in a molar ratio of from 200:1 to 5:1, preferably from 100:1 to 20:1, in the presence or absence of catalysts which accelerate the formation of allophanates and urethanes, (A2) deactivating the catalysts, if used, (A3) removing any unreacted diisocyanate C, and (A4) subsequently, mixing polyisocyanate B with a polyisocyanate A in the proportions specified in claim 1.

The reaction in step A1 may be effected in accordance with methods which are common knowledge, and, apart from the molar ratio of the diisocyanates C to alcohols A that is to be observed, is no different than the preparation of the allophanates which are common knowledge and are derived from monohydric alcohols, being known from EP-A-303150 or EP-A-524501. The same applies to step A2. The removal of unreacted isocyanate preferably takes place under reduced pressure in a thin-film evaporator (step A3). The blending of the polyisocyanates A and B is not critical (step A4).

In general, however, the practical procedure is to perform the reaction in such a way that the polyisocyanates B and the polyisocyanates A are formed in one reaction step (variants B and C).

In the case of variant B, the mixtures of the invention that are formed are principally those wherein the polyisocyanate A contains predominantly isocyanurate units. For this purpose, the procedure comprises (B1) reacting diisocyanates C and alcohols A in a molar ratio of from 200:1 to 5:1, preferably from 100:1 to 20:1, in the presence or absence of catalysts which accelerate the formation of isocyanurates, allophanates and urethanes, (B2) deactivating the catalysts, if used, and (B3) removing any unreacted isocyanate.

Apart from the fact that polyhydric alcohols (alcohols A) are used, which necessitates the stated adaptation of the molar ratio of the reactant alcohols A and polyisocyanates C, the procedure here may be as described in EP-A-524501, especially as regards the catalysis, the termination of reaction and the removal of the excess diisocyanate.

In the case of variant C, the mixtures of the invention that are formed are principally those wherein the polyisocyanate A contains predominantly biuret units. For this purpose, the procedure comprises (C1) reacting diisocyanates C, alcohols A and a biuretizing agent, the molar ratio of diisocyanates C to alcohols A being from 200:1 to 5:1, preferably from 100:1 to 20:1, and the molar ratio of diisocyanates C to the biuretizing agent being from 200:1 to 2:1, preferably from 100:1 to 4:1, in the presence or absence of catalysts which acclerate the formation of biurets, allophanates and urethanes, (C2) deactivating the catalysts, if used, and (C3) removing any unreacted diisocyanate C.

In step C1, the general procedure is first to combine the alcohol A and the entirety of the polyisocyanate C and to heat the mixture at temperatures from 100 to 150° C., and a few minutes later to add the biuretizing agent, the catalyst (if used) that accelerates the formation of biurets, allophanates and urethanes, and, if desired, a stabilizer as described in EP-A-809663, and reacting the mixture at temperatures from 150 to 200° C. for about 2 to 4 hours. Steps C2 and C3 subsequently take place usually as described in connection with variants A and B. Otherwise, the preparation of the mixture is subject to the same provisions as for the preparation of the polyisocyanates AII.

The mixtures of the invention may be commercialized in the form of formulations comprising the mixtures of the invention plus isocyanates other than the polyisocyanates A and B, and other auxiliaries commonly present in two-component polyurethane coating materials.

The polyisocyanates of the invention, and the mixtures of the invention, respectively, are particularly suitable as the B component in the preparation of 2-component coating materials comprising as their A component a compound carrying polyisocyanate-reactive groups, preferably a hydroxy-functional polymer (A).

The hydroxy-functional polymers (A) comprise, for example, polymers having a hydroxyl content of from 0.1 to 20, preferably from 0.5 to 10% by weight. The number-average molecular weight $M_n$ of the polymers is preferably from 1000 to 100000, with particular preference from 2000 to 10000. The polymers are preferably those containing more than 50% by weight of $C_1$ to $C_{20}$ alkyl (meth)acrylate, vinylaromatics having up to 20 carbon atoms, vinyl esters of carboxylic acids containing up to 20 carbon atoms, vinyl halides, nonaromatic hydrocarbons having 4 to 8 carbon atoms and 1 or 2 double bonds, unsaturated nitrites, and mixtures thereof. Particular preference is given to those polymers containing more than 60% by weight of $C_1$ to $C_{10}$ alkyl (meth)acrylates, styrene or mixtures thereof.

Furthermore, the polymers (A) include hydroxyl-functional monomers in accordance with the above hydroxyl content and, if desired, further monomers, examples being ethylenically unsaturated acids, especially carboxylic acids, acid anhydrides, or acid amides.

Further polymers (A) are, for example, polyesterols, as obtainable by condensation of polycarboxylic acids, especially dicarboxylic acids, with polyols, especially diols.

Further suitable polymers (A) include polyetherols, which are prepared by subjecting ethylene oxide, propylene oxide or butylene oxide to addition reactions with H-active components. Likewise suitable are butanediol polycondensates.

The polymers (A) may of course also comprise compounds containing primary or secondary amino groups.

Mention may be made, for example, of the products known as Jeffamines, i.e., amino-terminated polyetherols, or oxazolidines.

Besides the abovementioned A and B components, the 2-component coating compositions may further comprise other polyisocyanates and compounds containing polyisocyanate-reactive groups, as are commonly present in two-component coating compositions.

The molar ratio formed from the sum of the isocyanate groups in the B components in relation to the sum of the isocyanate-reactive groups of the component (A) is preferably from 0.6:1 to 1.4:1, more preferably from 0.7:1 to 1.3:1, with very particular preference 1:1.

The coating materials of the invention may further comprise organic solvents, e.g., xylene, butyl acetate, methyl isobutyl ketone, methoxypropyl acetate, and N-methylpyrrolidone. The low viscosity of the coating composition that is desired for processing, i.e, for application to substrates, is set using solvent.

The coating materials may of course include further additives customary in coating technology, examples being pigments, fillers, leveling assistants, etc.

They may additionally comprise catalysts for urethane formation, e.g., dibutyltin dilaurate.

The two-component polyurethane coating compositions may be prepared conventionally. Commonly, the A and the B components are mixed before the coating compositions are applied to a substrate. Mixing usually takes place from 0 to 12 h before application. The desired viscosity can be set using solvent.

The polyurethane coating compositions may be applied two-dimensionally to substrates in a conventional manner, by spraying, flow coating, rolling, brushing, knife coating, etc.

The coating compositions are especially suitable for workpieces featuring surfaces of metal, plastic, wood, woodbase materials, ceramic or glass.

EXPERIMENTAL SECTION

1. Preparation of the Polyisocyanates Containing Urethane and Allophanate Groups from HDI and Branched Aliphatic Diols 2,500 g of hexamethylene diisocyanate (HDI) were introduced under nitrogen blanketing and heated to 80° C. At this temperature, the amount of the alcohol or alcohol mixture stated in Table 1 was added. Following the homogeneous incorporation of the alcohol or alcohol mixture by stirring, 200 ppm by weight (based on diisocyanate) of the catalyst, N,N,N-trimethyl-N-(2-hydroxypropyl)ammonium 2-ethylhexanoate were added. Following the addition of the catalyst, a marked exothermic reaction was noted and the temperature rose to 100–120° C. The reaction was left to continue at this temperature and terminated at the NCO content stated in Table 1 by adding 250 ppm by weight (based on diisocyanate) of di-2-ethylhexyl phosphate. The reaction mixture was subsequently distilled in a thin-film evaporator at an oil temperature of 165° C. and at 2.5 mbar in order to remove monomeric HDI. Data on the end products are given in Table 1.

TABLE 1

Modified polyisocyanurates

| Polyisocyanate No. | Alcohol or alcohol mixture | Amount rel. to isocyanate (mol %) | NCO content of the mixture (% by wt.) | NCO content after distillation (% by wt.) | Viscosity at 23° C. (mPas) |
|---|---|---|---|---|---|
| 1 | Neopentyl glycol | 2 | 40.0 | 21.2 | 2980 |
| 2 | Neopentyl glycol | 3 | 36.4 | 20.1 | 4170 |
| 3 | 2,2,4-Trimethyl-1,3-pentanediol | 2 | 39.7 | 21.5 | 3020 |
| 4 | 2,2,4-Trimethyl-1,3-pentanediol | 5 | 35.7 | 20.1 | 6220 |
| 5 | 2-Ethyl-1,3-hexane-diol | 2 | 40.1 | 21.0 | 3400 |
| 6 | Neopentyl glycol hydroxypivalate | 2 | 38.5 | 20.8 | 4460 |
| 7 | Neopentyl glycol hydroxypivalate/ 2-ethylhexanol, 1:1 molar | 2 | 41.4 | 21.1 | 1850 |

2. Preparation of Polyisocyanurates Containing Urethane and Allophanate Groups from HDI and Branched Aliphatic Monoalcohols, Comparative Experiments 2500 g of hexamethylene diisocyanate (HDI) were introduced under nitrogen blanketing and heated to 80° C. At this temperature, the amount of monoalcohol stated in Table 2 was added. Following the homogeneous incorporation of the alcohol or monoalcohol by stirring, 200 ppm by weight (based on diisocyanate) of the catalyst, N,N,N-trimethyl-N-(2-hydroxypropyl)ammonium 2-ethylhexanoate were added. Following the addition of the catalyst, a marked exothermic reaction was noted and the temperature rose to 100–120° C. The reaction was left to continue at this temperature and terminated at the NCO content stated in Table 2 by adding 250 ppm by weight (based on diisocyanate) of di-2-ethylhexyl phosphate. The reaction mixture was subsequently distilled in a thin-film evaporator at an oil temperature of 165° C. and at 2.5 mbar in order to remove monomeric HDI. Data on the end products are given in Table 2.

TABLE 2

Modified polyisocyanurates, comparative experiments

| Polyisocyanate No. | Alcohol | Amount rel. to isocyanate (mol %) | NCO content of the mixture (% by wt.) | NCO content after distillation (% by wt.) | Viscosity at 23° C. (mPas) |
|---|---|---|---|---|---|
| 8 (Comparative) | tert-Butanol | 2 | 40.9 | 21.9 | 1840 |
| 9 (Comparative) | 2-Ethylhexanol | 2 | 36.8 | 21.1 | 2640 |

3. Preparation of a Polybiuret Containing Urethane and Allophanate Groups from HDI and Branched Aliphatic Diols 2500 g of HDI, 125 g of tert-butanol and 43.5 g of 2,2,4-trimethyl-1,3-pentanediol (2 mol % based on HDI) were introduced under nitrogen blanketing and heated to 130° C. At this temperature, a mixture of 15 g of tert-butanol, 2.5 g of distilled water and 2.2 g of urea was added over the course of 2 minutes. Evolution of $CO_2$ was vigorous. After the end of the evolution of gas, the reaction mixture was stirred at 180° C. for 3 h. The reaction mixture was subsequently distilled in a thin-film evaporator at an oil temperature of 165° C. and at 2.5 mbar in order to remove monomeric HDI. The modified polybiuret had a viscosity at 23° C. of 19300 mPas and an NCO content of 20.6%.

4. Testing of the Storage Stability of Polyisocyanates of the Invention 4.1. Testing of the Storage Stability at 23° C. in Ethyl Acetate (Water Content 0.1%), Closed Container The polyisocyanates of the invention and the standard polyisocyanate Basonat® HI 100 (comparative, BASF AG) were diluted to a solids content of 30% using ethyl acetate and stored in sealed glass containers. The samples were examined visually at daily intervals for clouding or flocculation.

TABLE 3

Storage stability at 23° C. in ethyl acetate (water content 0.1%), closed container

| Storage time | Basonat ® HI 100 (Comparative) | Inventive polyisocyanates as per Tab. 1 | | | | |
|---|---|---|---|---|---|---|
| | | No. 1 | No. 2 | No. 5 | No. 6 | No. 7 |
| 3 days | n.i.o. | i.o. | i.o. | i.o. | i.o. | i.o. |
| 21 days | | i.o. | i.o. | i.o. | i.o. | i.o. |

3.2 Testing of the Storage Stability in Open Containers Under Standard Conditions (23° C., 50% Relative Atmospheric Humidity)

The polyisocyanates of the invention, the comparative products, and the standard polyisocyanate Basonate® HI 100 (comparative, BASF AG) were diluted to a solids content of 70% using 1:1 solvent naphtha/butyl acetate and stored in open containers. At daily intervals, the change in viscosity was measured by determining the efflux time in accordance with DIN EN ISO 2431 (4 mm efflux nozzle).

TABLE 4

Storage stability in open containers under standard conditions (23° C., 50% relative atmospheric humidity)

Efflux time/s (DIN EN ISO 2431 with 4 mm nozzle)

| Storage time | Basonat® HI 100 (compar.) | Inventive polyisocyanates as per Tab. 1 and comparative products as per Tab. 2 | | | | | | | No. 8 (compar.) | No. 9 (compar.) |
| --- | --- | --- | --- | --- | --- | --- | --- | --- | --- | --- |
| | | No. 1 | No. 2 | No. 3 | No. 4 | No. 5 | No. 6 | No. 7 | | |
| Immediate | 17 | 17 | 19 | 17 | 20 | 19 | 19 | 17 | 17 | 18 |
| Gelled after (d) | 12 | 21 | 21 | 21 | 21 | 21 | 21 | 21 | 13 | 12 |

Both in opened containers in the presence of moist air, and when diluted with hydrous solvents, the storage stabilities of the polyisocyanates 1 to 7 of the invention were found to be greatly improved relative to the standard polyisocyanate and also relative to the monoalcohol-modified products as per Table 2.

The testing of the performance properties of the polyisocyanates of the invention in polyurethane coating systems showed no differences from the standard.

We claim:

1. A mixture comprising
   a) polyisocyanates (polyisocyanates A), comprising structural units selected from the isocyanurate and biuret group, derived from aliphatic or cycloaliphatic diisocyanates (diisocyanates C),
   b) non-A polyisocyanates (polyisocyanates B), comprising structural units selected from the allophanate and urethane group, derived from
      b1) aliphatic or cycloaliphatic diisocyanates (diisocyanates C) and
      b2) an alcohol consisting of polyhydric aliphatic alcohols or polyhydric cycloaliphatic alcohols (alcohols A),
   the molar ratio of the polyisocyanates A to the polyisocyanates B being from 200:1 to 5:1.

2. A mixture as claimed in claim 1, wherein the polyisocyanates A comprise 1, 2 or 3 structural units selected from the isocyanurate and biuret group.

3. A mixture as claimed in claim 1 or 2, wherein the diisocyanate C is of the formula (I) OCN—$R^1$—NCO and $R^1$ is an alkylene or cycloalkylene unit having 4 to 20 carbon atoms.

4. A mixture as claimed in claim 1, wherein said diisocyanate C comprises isophorone diisocyanate or hexamethylene diisocyanate.

5. A mixture as claimed in claim 1, wherein the alcohol A is of the formula (II) HO—$R^2$—OH and $R^2$ is an alkylene or cycloalkylene unit having 2 to 20 carbon atoms which is uninterrupted or interrupted by oxygen atoms and in which, if desired, 1 to 4 carbon atoms are substituted by $C_1$ to $C_{12}$ alkyl radicals.

6. A mixture as claimed in claim 1, wherein the polyisocyanate B is of the formula (III)

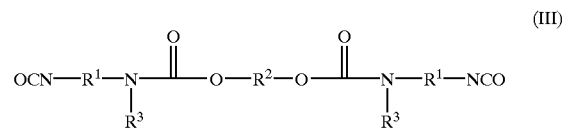

in which
   $R^1$ is of the formula I OCN—$R^1$—NCO and $R^1$ is an alkylene or cycloalkylene unit having 4 to 20 carbon atoms,
   $R^2$ is of the formula II HO—$R^2$—OH and $R^2$— is an alkylene or cycloalkylene unit having 2 to 20 carbon atoms which is uninterrupted or interrupted by oxygen atoms and in which, if desired, 1 to 4 carbon atoms are substituted by $C_1$ to $C_2$ alkyl radicals, and
   $R^3$ is hydrogen or a radical —CO—NH—$R^1$—NCO, $R^1$ having the same definition as in the formula I, with the proviso that at least one radical $R^3$ is not hydrogen.

7. A formulation as claimed in claim 1, comprising isocyanates other than the polyisocyanates A and B, and other auxiliaries commonly present in two-component polyurethane coating materials.

8. A process for preparing a mixture as claimed in claim 1, which comprises first preparing the polyisocyanate B by
   (A1) reacting diisocyanates C and alcohols A in a molar ratio of from 200:1 to 5:1, in the presence or absence of catalysts which accelerate the formation of allophanates and urethanes,
   (A2) deactivating the catalysts, if used,
   (A3) removing any unreacted diisocyanate C, and
   (A4) subsequently, mixing polyisocyanate B with a polyisocyanate A in the proportions specified in claim 1.

9. A process for preparing a mixture as claimed in claim 1, in which the polyisocyanate A comprises predominantly isocyanurate units, which comprises
   (B1) reacting diisocyanates C and alcohols A in a molar ratio of from 200:1 to 5:1, in the presence or absence of catalysts which accelerate the formation of isocyanurates, allophanates and urethanes,
   (B2) deactivating the catalysts, if used, and
   (B3) removing any unreacted diisocyanate C.

10. A process for preparing a mixture as claimed in claim 1, in which the polyisocyanate A contains predominantly biuret units, which comprises (C1) reacting diisocyanates C, alcohols A and a biuretizing agent, the molar ratio of diisocyanates C to alcohols A being from 200:1 to 5:1, and the molar ratio of diisocyanates C to the biuretizing agent being from 200:1 to 2:1, in the presence or absence of catalysts which accelerate the formation of biurets, allophanates and urethanes, (C2) deactivating the catalysts, if used, and (C3) removing any unreacted diisocyanate C.

11. A two-component coating composition comprising a compound which carries polyisocyanate-reactive groups (A component) plus a mixture as claimed in claim 1 (B component).

12. A method of coating articles, which comprises preparing a coating composition as claimed in claim 11 by mixing the components (A) and (B), and applying the coating composition two-dimensionally to an article within 12 h after its preparation.

13. A coated article produced as claimed in claim 12.

* * * * *